US012578279B2

(12) United States Patent
Potasz et al.

(10) Patent No.: US 12,578,279 B2
(45) Date of Patent: Mar. 17, 2026

(54) DEVICE FOR AUTOMATIC VEHICLE BODY DAMAGE DETECTION

(71) Applicant: VUMO Sp. z o.o., Cracow (PL)

(72) Inventors: Sławomir Potasz, Cracow (PL); Daniel Sygut, Cracow (PL); Maciej Sajdak, Cracow (PL); Michał Laska, Cracow (PL); Jakub Wiercioch, Cracow (PL)

(73) Assignee: VUMO SP. Z O.O., Krakow (PA)

( * ) Notice: Subject to any disclaimer, the term of this patent is extended or adjusted under 35 U.S.C. 154(b) by 14 days.

(21) Appl. No.: 18/377,815

(22) Filed: Oct. 8, 2023

(65) Prior Publication Data

US 2024/0310291 A1 Sep. 19, 2024

(51) Int. Cl.
*G01N 21/88* (2006.01)
*G06T 7/00* (2017.01)

(52) U.S. Cl.
CPC ....... *G01N 21/8806* (2013.01); *G06T 7/0004* (2013.01); *G01N 2021/8816* (2013.01); *G06T 2207/20084* (2013.01); *G06T 2207/30252* (2013.01)

(58) Field of Classification Search
CPC ....... G01N 21/8806; G01N 2021/8816; G01N 21/8851; G01N 21/9515; G01N 21/00; G01N 21/88; G01N 21/95; G06T 7/0004; G06T 2207/20084; G06T 2207/30252; G06T 2207/20081; G06T 2207/30156; G06T 7/00; G01B 11/25; G01B 11/30
See application file for complete search history.

(56) References Cited

U.S. PATENT DOCUMENTS

2013/0057678 A1* 3/2013 Prior Carrillo .... G01N 21/8806
348/125
2020/0011808 A1* 1/2020 Ozim ................. G01B 11/2522

* cited by examiner

*Primary Examiner* — Thanh Luu
*Assistant Examiner* — Mai Thi Ngoc Tran
(74) *Attorney, Agent, or Firm* — Andrzej Malarz, Esq.

(57) ABSTRACT

A device for automatic detection of car body damage according to the invention includes at least one lighting module, to which a data processing device is mounted on the rear wall, and the front surface is a light source, on which at least one image recording device is mounted, and on the side wall—there is a measuring unit containing at least four sensors, with the lighting module located at a distance of 40 to 100 cm from the surface of the vehicle body or other detail, and the image recording device is a monochrome camera with a resolution of at least 3 Mpix with a hardware input that triggers the shutter, capable of synchronizing with a lighting module and an image recording device, the lens of which is equipped with the possibility of manual adjustment.

13 Claims, 3 Drawing Sheets

3a

3b

2

10

13a

13b

10

12

11

4b 3a    3b s

DEVICE FOR AUTOMATIC VEHICLE BODY DAMAGE DETECTION

CROSS-REFERENCE TO RELATED APPLICATIONS

The present application is a Non-Provisional Application filed under 35 U.S. Code § 111(a), claiming a priority of Polish Patent Application No.: P.444081, filed on Mar. 15, 2023, content of which is incorporated herewith for all purposes.

BACKGROUND OF THE INVENTION

According to estimates, there are almost 1.5 billion cars in the world, in addition to many other vehicles, such as all kinds of industrial machinery, construction machinery, agricultural machinery, motorcycles, scooters, etc. These vehicles, especially due to operation, are subject to various types of damage, in particular, their outer casing is exposed to damage. Those damaged vehicles typically require repairs, and it is important to locate and classify any damages or other defects that occur. Modern technology allows such damage to be identified using automation, with the most common technique being scanning the surface of the vehicle and assessment by a specialist, or dedicated software to assess the damages found, currently even using neural networks and machine learning. These types of tests use various kinds of lighting techniques, image recording devices, sensors, methods of controlling elements of the damage assessment system, visualization of the results obtained, and even estimation of repair costs. These types of devices are used not only at service shops but also by insurance companies. Hence, the use of these types of devices is becoming increasingly common, as is claiming these solutions at the Patent Offices.

Despite the many patent applications, more new developments that differ from the earlier disclosed patent descriptions are emerging.

International patent application No. WO2021176389 discloses a scanning head for detecting defects on surfaces and a detection station with said scanning head, wherein the scanning head for detecting defects on surfaces, in particular the motor vehicle body moves along scanning paths guided around the object's contour by a positioner in the detection station. The head includes at least one line camera with a recording segment that is transverse to the scan path, to allow the surface images to be composed using a sum of the recording segments sequentially acquired by the camera as the head moves along the scanning paths. The head also includes a main illuminator, which is located close to the camera, and two secondary illuminators located further away from the camera in the direction of the head's movement along the scanning paths.

Known from International Patent Application No. WO2005100960A1, a surface defect testing device including an irradiation system having a plurality of light-emitting elements set up in a predetermined arrangement and an imaging camera to view the surface to be tested irradiated with light from the light-emitting elements, the arrangement pattern being such that the light-emitting elements are arranged continuously, to leave dark surfaces of predetermined shapes within the pattern of arrangement, the imaging camera being positioned on at least one dark surface to receive the light emitted from each light-emitting element and reflected from the surface to be tested, and a copying unit for moving a plurality of light-emitting elements and the imaging camera in one combined body along to provide the entire surface to be tested.

German Patent Application No. DE102015119240B3 discloses a method for automatically detecting defects on the surface of a workpiece and generating a robot program for machining the workpiece. In an example of the invention's implementation, a method is described for locating defects on the surface of a workpiece and determining the three-dimensional topography of the located defects and categorizing at least one located defect based on its topography. Depending on the defect category of at least one defect, a machining process is selected and, according to the selected machining process, a robot program is created for machining at least one defect with the computer-aided robot.

German patent application No. DE102018118602B3 discloses a method for detecting and analyzing surface defects in three-dimensional objects having a reflective surface, in particular motor vehicle bodies, in which surface defects are evaluated based on the evaluation of at least one camera, and the image of the light pattern is projected from at least one first of the lighting device on at least one part of the surface in the form of a raster image and is identified by a two-dimensional raster coordinate system and the device is capable of identifying surface imperfections solely from the two-dimensional image information utilizing an image processing algorithm, thus requiring no "environmental parameters" and costly geometrical calculations can be dispensed with. Moreover, it is possible to optimize the method according to the invention by employing a "deep learning" strategy.

German patent application DE102020000581 describes an apparatus for automatically detecting vehicle damage, comprising a skylight, the light tunnel having a plurality of stripe light sources, at least one camera, at least one main first camera, at least one main second camera, at least one local computer, which has one or more powerful graphics processors and receives images from at least one camera, a first main camera and a second main camera, evaluates them and calculates the output, and includes at least one additional computer with a video card where one or more artificial neural networks, able to optimize object detectors and the measurement method.

US patent description US20210375078A1 discloses a method of detecting minor damage to a vehicle. The disclosed technology may have one or more processors, a projector system in communication with one or more processors, a projector system configured to project electromagnetic radiation onto at least one surface of the vehicle and receive, via one or more sensors, sensor data comprising at least part of the electromagnetic radiation reflected from one or more surfaces of the vehicle, a memory that stores computer-readable instructions. The analysis is based on the reflected electromagnetic radiation and the expected pattern of the reflected electromagnetic radiation, which determines whether the vehicle has damage on one or more surfaces.

US patent description US20220172343 discloses a method of detecting potential dents in a reflective surface, a system and a computer program for implementing the same, wherein the device is placed on a drone that is equipped with an image acquisition device and an elongated light source and a data processing device. An image acquisition device by moving a flying drone past a surface along a trajectory so that for each photo in a series of photos, a light source illuminates the appropriate part of the surface. The data processing device operates to analyze the reflection shape of the specular light source in the images from the image series to estimate the location of any dents on the surface.

US patent description US 20220129860 discloses a method and system for assessing structural damage. According to one embodiment, the method comprises detecting one or more outer structure parts from a video of the structure using a first machine learning (ML) module trained to identify in one or more video frames the outer structure part. The method also includes the use of a second ML module trained to detect and classify damaged areas of the structure from one or more video frames: (i) identifying one or more damaged areas of the structure, and (ii) classifying one or more damaged regions based on the types of damage. The method further comprises associating one or more damaged regions and corresponding types of damage to one or more external parts.

Known from European Patent No. EP3696537A1, a moving vehicle damage detection apparatus includes a lighting system for illuminating a moving vehicle, a sensor system for capturing image data from a moving vehicle, and an evaluation system for detecting vehicle damage based on captured image data. The lighting system comprises at least one of the following: a lighting unit that is configured to illuminate the moving vehicle with monochromatic and/or polarized light, and a first lighting unit that is configured to illuminate the moving vehicle with a first light. The sensor system comprises at least one of the following: a sensor element that is arranged to acquire image data of a moving vehicle when illuminated with monochromatic and/or polarized light.

The methods and devices disclosed in the mentioned and many other patent descriptions make it possible to locate damage on the surface of the car body by means of various means and computational methods. Patterns are often used for damage analysis, which significantly reduces the versatility of the device and limits its use to specific types of vehicles. In addition, these devices are complex and require the use of complex algorithms. Therefore, these methods are sub-optimal, which can be proven not only by the large number of still reported methods of detecting damage, but above all by the lack of a reliable and simple method that will enable quick data collection and analysis, and will also enable the use of artificial intelligence to optimize detection methods, classification and damage measurement.

BRIEF SUMMARY OF THE INVENTION

The present invention aims to develop a measuring station where at least one light, vision and measuring module is mounted on a structure that moves using known technical means for the implementation of kinematics, for example, a free-standing or suspended device with at least three axes, an autonomous driving robot, a flying robot-a drone and other known technical means, and independent drives enable the movement of the device around the vehicle parked on the station or the detail placed inside the working field. The drives are computer controlled based on readings from the measurement module containing sensors, enabling the unit to pass around the vehicle at a certain distance from the body shell or other detail, and the image recording device placed in the vision module scans the surface of the body or other detail. The lighting module has an emissive surface based on at least one source of visible light in the form of an LCD screen or an LED screen generating a pattern of structural bands of light with different intensities of the same color, or with different light color, or with different intensity of light of different colors, or an emissive surface based on independent light sources evenly distributed within the module, the light of which is subjected to diffusion, creating a uniform emission stream falling on the structural diffuser, generating light of different intensity of the same color, or of different light color, or different light intensity of different colors. In the case of using the white emission surface, the difference in color temperature of the adjacent structural bands must be at least 100K. For the use of other colors in the visible light range, the effect of the reflex image caused by different colors of light or different light intensities of different colors, recorded by a monochrome sensor with a resolution of at least 8 bits, should correspond to the reflex image of the emission surface with bands of different light intensity of the same color. The average difference in pixel brightness (where the brightness of each pixel in the image is expressed as a multiple of a brightness unit) from two adjacent lanes must be greater than 1 brightness unit. The pixel brightness unit is defined as the basic, indivisible unit of brightness of the image obtained directly from the camera. The image recording device is a camera with appropriate parameters, and if more than one image recording device is used, they are placed in such a way that the fields of view of adjacent devices partially overlap. The control and computing unit consists of an industrial computer that stores data collected from recording devices, analyzes input data from the measurement module consisting of position sensors and controls the drives and sends control signals to the control modules and directly to the vision modules. The computer communicates with the computing and data storage cloud, where the process of data analysis takes place through neural networks responsible for damage detection and controls the energy storage unit. Thanks to this, in the places of dents, reflections of adjacent, contrasting bands in the image of the vehicle body or other detail are observed, while thanks to the emission of light by both types of structural stripes, it is possible to observe surface damage, e.g. scratches and chips. Existing solutions using modules with high mutual contrast bands do not allow observation of shaded areas, making correct detection based on object images impossible.

The device for automatic detection of car body damage according to the invention includes at least one lighting module, to which a data processing device is mounted on the rear wall, and the front surface is a light source, on which at least one image recording device is mounted, and on the side wall there is a measuring unit containing at least four sensors, with the lighting module located at a distance of 40 to 100 cm from the surface of the vehicle body or other detail, and the image recording device is a monochrome camera with a resolution of at least 3 Mpix with a hardware input that triggers the shutter, capable of synchronizing with a lighting module and an image recording device, the lens of which is equipped with the possibility of manual adjustment, where the focal length equivalent for the image recording device used is the value of the EKo focal length equivalent for the 35 mm format image recording device lens, corresponding to at least ten times the ratio of the distance L of the lighting module to the surface of the car body or other detail to the width S of the lighting module expressed in mm, with the formula: $EKo>=10*L/S$, while the visible light source is provided with a screen in the form of alternating light and dark bands with a width of 3 to 30 mm and the luminance ratio of adjacent bands in a maximum ratio of 10:1, preferably 2:1, using visible light with a luminance value of each type of structural stripes of at least 200 cd/m2, and the computer, based on data collected from the lighting module, image recording devices and at least four sensors control the movement of the lighting module and the image recording device, while the data from the computer are stored in the computing cloud, where the process of data analysis by neural networks responsible for damage detection takes place.

In a preferred embodiment, in the device for automatic detection of car body damage, the light source is an LED screen, generating an image of various intensity and color, creating an emission stream consisting of alternating light and dark bands contrasting with each other.

In a preferred embodiment, in the device for automatic detection of car body damage, the source of light is an LCD screen, generating an image of various intensity and color, creating an emission stream consisting of alternating light and dark bands contrasting with each other.

In a preferred embodiment, in the device for automatic detection of car body damage, the light source is LEDs, generating light of varying intensity and color, creating a uniform stream of light falling on the cover consisting of alternately contrasting light and dark bands.

In a preferred version of the device for automatic detection of car body damage, the lighting panel is mounted on a structure and has the ability to move in three axes and rotate around the vertical axis, and independent drives attached to the structure enable the device to move around the vehicle or detail placed inside the working field, and the drives of the moving structure are computer-controlled based on readings from sensors mounted on the lighting module, including at least one encoder displacement sensor mounted on each of the shift and rotation axes, at least one optical sensor intended for determining the position of the module in relation to the investigated object and at least two time of flight sensors to prevent the device from colliding with the investigated object.

In a preferred implementation, in the device for automatic detection of car body damage, the lighting module is mounted on a mobile autonomous robot.

In a preferred embodiment, in the device for automatic detection of car body damage, the lighting module is mounted on a drone.

In a preferred embodiment, in the device for automatic detection of car body damage, the image recording device is a color camera with a resolution of at least 8 Mpix.

In a preferred embodiment, in the device for automatic detection of car body damage, the light source generates an image of uniform intensity and different color of light.

In a preferred embodiment, in the device for automatic detection of car body damage, the light source generates an image with different light intensity and different color.

In a preferred embodiment, in the device for automatic detection of car body damage, for the emission surface of white color, the difference in color temperature of adjacent structural bands must be at least 100K.

In a preferred embodiment, in the device for automatic detection of car body damage, using other colors in the visible light range, the effect of the reflex image caused by different colors of light or different light intensity of different colors, recorded by a monochrome sensor with a resolution of at least 8 bits, should correspond to the image of the reflection of the emission surface with bands of different light intensity of the same color. The average difference in pixel brightness, where the brightness of each pixel in the image is expressed as a multiple of a brightness unit, of two adjacent bands must be greater than 1 brightness unit. The pixel brightness unit is defined as the basic, indivisible unit of brightness of the image obtained directly from the camera.

In a preferred embodiment, in the device for automatic detection of car body damage, using at least two image recording devices, they are placed in such a way that the fields of view of neighboring devices partially overlap.

BRIEF DESCRIPTION OF SEVERAL VIEWS OF THE DRAWING

The subject of the invention is presented in exemplary embodiments in the drawing, in which.

Figure 1:
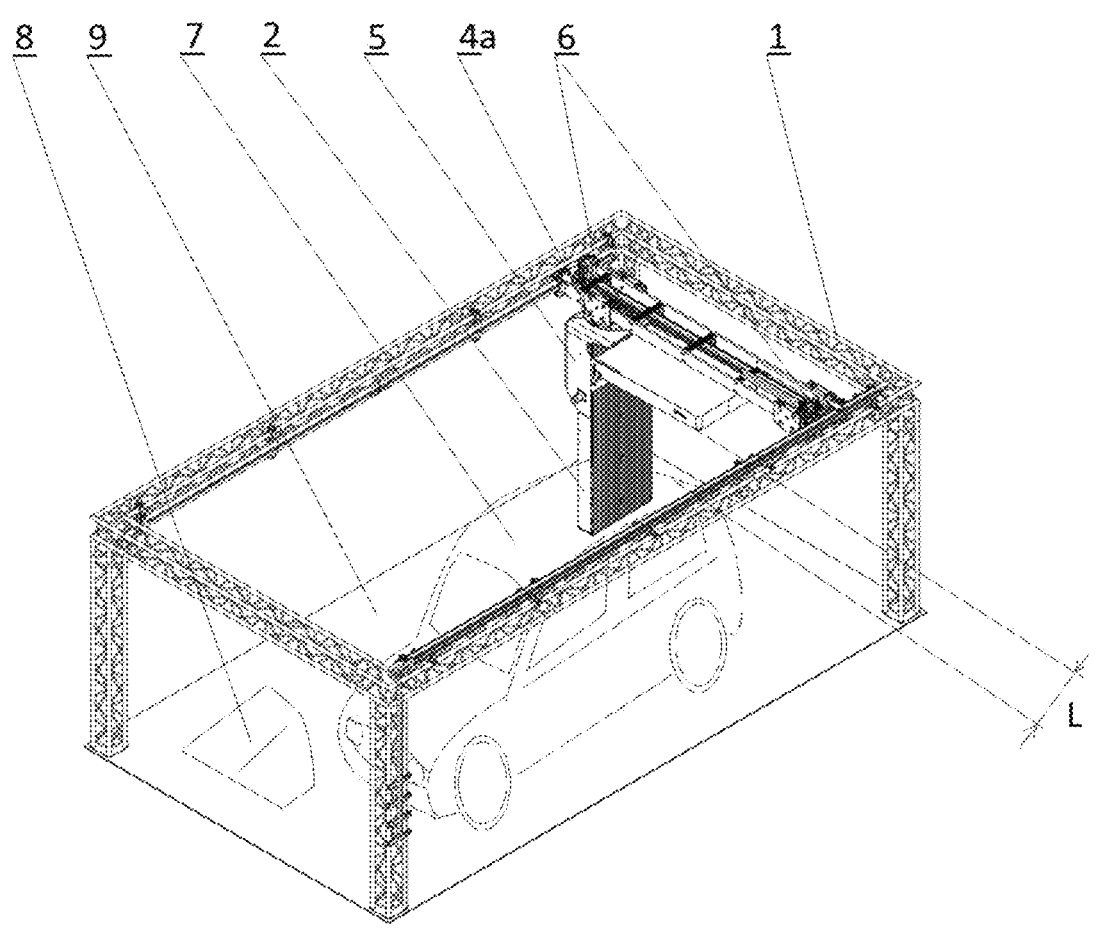
FIG. 1 shows a perspective view of the device with two lighting panels mounted on the structure (1).
Figure 2:
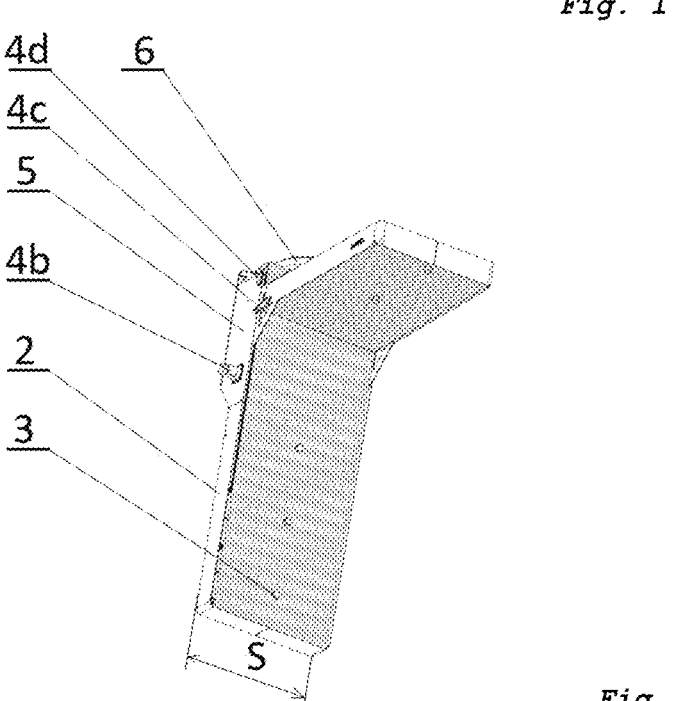
FIG. 2 shows a perspective view of a lighting panel consisting of two lighting panels with three cameras on the vertical and two cameras on the horizontal panel.
Figure 3:
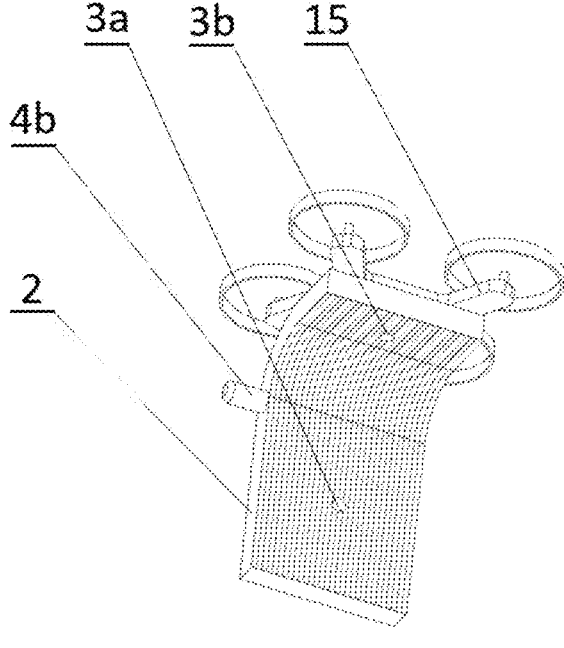
FIG. 3 shows a perspective view of a lighting panel with two cameras placed on a drone.
Figure 4:
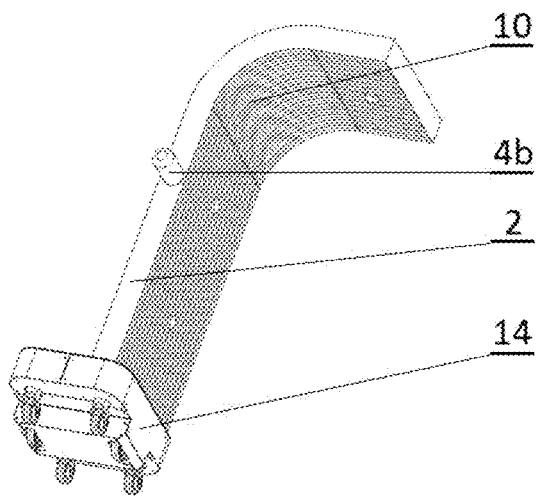
FIG. 4 shows a perspective view of a lighting panel with three cameras placed on an autonomous driving robot.
Figure 5:
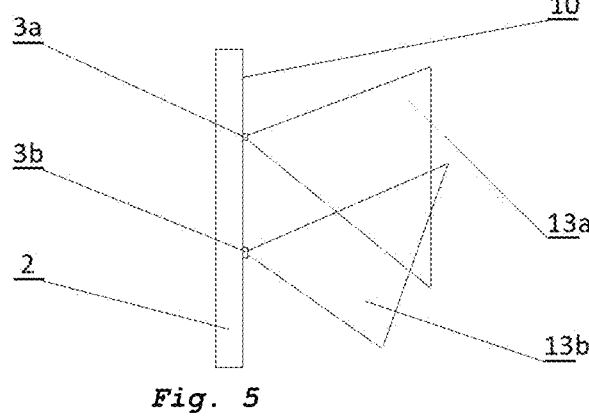
FIG. 5 shows a rectangular view of the lighting module with two image recording devices and a partially overlapping field of view of the recording devices.
Figure 6:
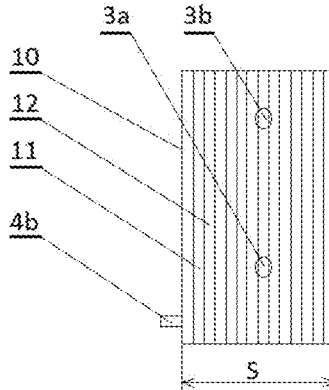
FIG. 6 is a rectangular view of the lighting module with two image recording devices and visible bands on the front surface of the light source.
Figure 7:
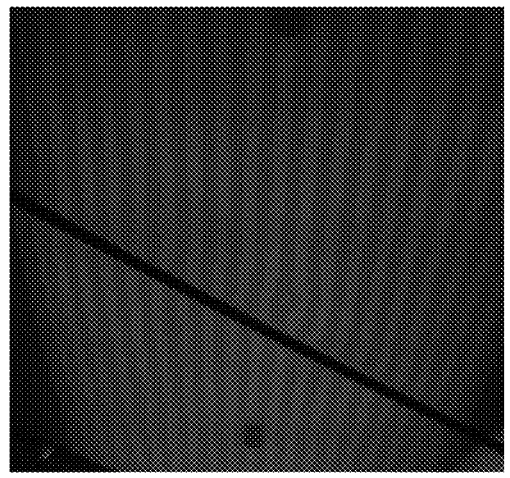
FIG. 7 shows a photo of a fragment of the car body damaged as a result of the dent.
Figure 8:
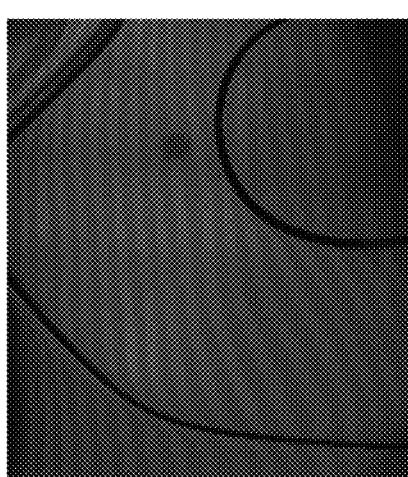
FIG. 8 shows a photo of a fragment of the car body damaged as a result of scratching.

The object of the invention is shown in the implementation examples.

DETAILED DESCRIPTION OF THE INVENTION

Example 1

The device for automatic detection of car bodies, has two lighting modules mounted on the frame, placed at an angle of 90° to each other, five cameras with a global shutter sensor, monochrome, with a resolution of 3 Mpix and a computing device that controls these elements and receives and processes data from image recording devices and based on readings from 7 sensors recording the movement of the panel: four encoder displacement sensors on each of the shift axes and on the axis of rotation, one optical sensor used to determine the position of the lighting set in relation to the tested object and two optical sensors to prevent collisions of the device with the tested object, the lighting panel has an outer cover with alternating light and dark bands 20 mm wide and a 2:1 luminance ratio of the light stripe to the dark stripe, using visible light with an average luminance value of the brighter bands of 5000 cd/m2, and the cameras are placed in such a way that their field of vision partially overlaps.

Example 2

A device for automatic detection of car body damage, has one lighting module mounted on a drone, three cameras with a global shutter type sensor, monochrome, 3 Mpix resolution and a computing device controlling these elements and receiving and processing data from image recording devices and based on readings from 8 sensors recording the movement of the panel: two optical sensors used to determine the position of the lighting set in relation to the tested object, three time of flight sensors and two optical sensors to prevent collisions of the device with the tested object, the lighting panel has an outer cover containing alternating bright bands and dark bands, 10 mm wide, with a 10:1 light-to-dark luminance ratio, using visible light with an average luminance value of the darker bands of 1000 cd/m2, and the cameras are positioned so that their field of view partially overlaps.

Example 3

A device for automatic detection of car body damage has one lighting module mounted on an autonomous robot, three cameras with a global shutter type sensor, monochrome, 3 Mpix resolution and a computing device controlling these elements and receiving and processing data from image recording devices and based on readings from 7 sensors recording the movement of the panel: two optical sensors used to determine the position of the lighting set in relation to the tested object, three time-of-flight sensors and two optical sensors to prevent collisions of the device with the tested object, the lighting panel has an outer cover containing alternating stripes light and dark with a width of 15 mm and a luminance ratio of light to dark stripes in the ratio of 4:1, with the panels using visible light with an average luminance value of the darker stripes of 250 cd/m2, and the cameras are placed in such a way that their field of view is partially overlapping.

The device for automatic detection of car body damage can be used to detect damage to any painted details, various types of housings or their parts.

Existing solutions using modules with bands with high mutual contrast do not allow observation of shaded areas, preventing correct detection based on photos of the object.

As the vision modules move around the vehicle or detail being examined, refractions of reflections of adjacent, contrasting bands in the image of the vehicle body or other detail are observed at the dent locations, while light emission by both types of structural bands makes it possible to observe surface damage, such as scratches and chips. The contrast between adjacent bands of the emissive surface results in a visible distortion of the structural pattern in the reflection observed by the vision array within the indentation. The use of a pattern with luminous components allows the observation of surface damage in areas while existing solutions shade surfaces and prevent their detection.

The invention claimed is:

1. A device for an automatic detection of damage to a bodywork of motor vehicles, wherein the device comprises at least one lighting module (2), to which a computing computer is attached on a rear wall and a front surface is a light source (10), to which at least one image capturing device (3) is mounted, and to which a measuring unit containing at least four sensors (4a), (4b), (4c) and (4d) is mounted on a side wall, the lighting module (2) being between 40 and 100 cm from a surface of a vehicle body (7) or workpiece (8), and the image capturing device (3) is a monochrome camera with a resolution of at least 3 Mpix with a hardware shutter release input, capable of synchronisation with the lighting module (2) and the image capturing device (3), lens of which is manually adjustable, whereby a focal length equivalent of the image capturing device (3) used has a focal length equivalent value EKo for the lens of the image capturing device (3) of 35 mm format corresponding to at least 10 times the ratio of the distance L of the lighting module (2) from the surface of the vehicle body (7) or workpiece (8) to the width S of the lighting module (2) expressed in mm, with the formula: $EKo >= 10*L/S$, while a visible light source (10) is provided with a screen in the form of alternately contrasting light (11)

and dark (12) bands with a width of 3 to 30 mm and a luminance ratio of adjacent bands in a maximum ratio of 10:1, using visible light with a luminance value of at least 200 cd/m2 for each type of structured bands, and a computer (5) based on data collected from the lighting module (2), image capturing devices (3) and at least four sensors (4a), (4b), (4c) and (4d) controls the movement of the lighting module (2) and the image capturing device (3), with the data from the computer (5) being stored in a computing cloud, where the data analysis process by a neural networks responsible for damage detection takes place.

2. The device for the automatic detection of damage to the bodywork of motor vehicles according to claim 1, wherein the light source (10) is a LED screen, generating an image of different intensity and color, creating an emissive stream consisting of alternately contrasting light (11) and dark (12) bands.

3. The device for the automatic detection of damage to the bodywork of motor vehicles according to claim 1, characterized in that the light source (10) is an LCD screen, generating an image of varying intensity and color, forming an emission stream consisting of alternately contrasting light (11) and dark (12) bands.

4. The device for automatic detection of damage to motor vehicle bodies according to claim 1, wherein the light source (10) are LEDs, generating light of varying intensity and color, forming a uniform beam of light falling on a cover consisting of alternately contrasting light (11) and dark (12) bands.

5. The device for the automatic detection of damage to the bodywork of motor vehicles according to claim 1, wherein a lighting module (2) is mounted on the structure (1) and has the ability to move in three axes and rotate around a vertical axis, and independent drives (6) fixed to the structure (1) allow movement of a device around the vehicle (7) or workpiece (8) located inside a working field (9), wherein the drives (6) of the moving structure (1) are computer controlled based on readings from sensors mounted on the lighting module (2), including at least one encoder displacement sensor (4a) mounted on each of shift and rotation axes, at least one optical sensor (4b) intended for determining a position of the lighting module (2) in relation to an investigated object and at least two time of flight sensors (4c) and (4d), wherein the at least two time of flight sensors (4c) and (4(d) prevent the device from colliding with the investigated object.

6. The device for automatic detection of damage to motor vehicle bodies according to claim 1, wherein the lighting module (2) is mounted on a mobile autonomous robot (14).

7. The device for the automatic detection of damage to the bodywork of motor vehicles according to claim 1, wherein the lighting module (2) is mounted on a drone (15).

8. The device for automatic detection of damage to motor vehicle bodies according to claim 1, wherein the image capturing device (3) is a color camera with a resolution of at least 8 Mpix.

9. The device for the automatic detection of damage to the bodywork of motor vehicles according to claim 1, wherein the light source (10) generates an image with uniform intensity and different light colors.

10. The device for automatic detection of damage to motor vehicle bodies according to claim 1, wherein the light source (10) generates an image with different light intensity and color.

11. The device for the automatic detection of damage to the bodywork of motor vehicles according to claim 1, wherein for a white emission surface, a difference in color temperature of adjacent structural bands must be at least 100K.

12. The device for automatic detection of damage to motor vehicle bodies according to claim 1, wherein when using other colors in a visible light range, an effect of a reflex image caused by different colors of light or different light intensities of different colors, recorded by a monochrome sensor with a resolution of at least 8-bit, should correspond to the reflex image of an emission surface with bands of different light intensities of the same color; wherein the average difference in pixel brightness, where the brightness of each pixel in the image is expressed as a multiple of a brightness unit, of two adjacent bands must be greater than 1 brightness unit; and the pixel brightness unit is defined as the basic, indivisible unit of brightness of the image obtained directly from the camera.

13. The device for the automatic detection of damage to the bodywork of motor vehicles according to claim 1, wherein when using at least two image capturing devices (3*a*) and (3*b*), the two image capturing devices (3*a*) and (3*b*) are positioned in such a way that fields of view (13*a*) and (13*b*) of adjacent devices partially overlap.

\* \* \* \* \*